Oct. 22, 1935.    J. E. THORNTON    2,018,195
PRODUCTION OF PHOTOGRAPHIC AND CINEMATOGRAPH MOSAIC COLOR POSITIVES
Filed April 25, 1934
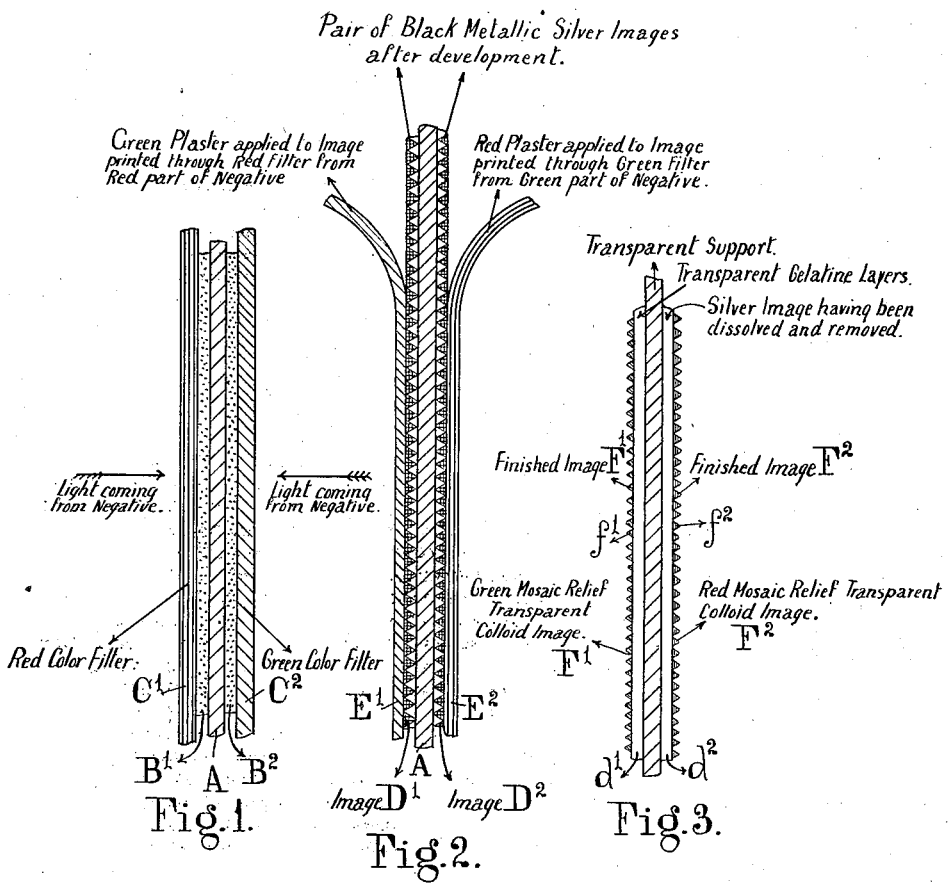
INVENTOR Patented Oct. 22, 1935

2,018,195

UNITED STATES PATENT OFFICE 2,018,195

PRODUCTION OF PHOTOGRAPHIC AND CINEMATOGRAPH MOSAIC COLOR POSITIVES

John Edward Thornton, Jersey, Channel Island

Application April 25, 1934, Serial No. 722,348
In Great Britain March 29, 1934

4 Claims. (Cl. 95—2)

This invention relates to an entire new type of photographic mosaic multi-color positive having a very high degree of transparency or luminosity, which is of subtractive type and can be made with two or four colors, and in various forms, for example as photographic color prints mounted upon paper or other reflective opaque backing for viewing by reflected light; upon cellulose or transparent paper for lamp shades and other decorative or advertising transparencies, upon a temporary paper support for use as a transfer to any desired surface; upon glass or cellulose as lantern slides for projection; upon cinematograph film for enlarged projection onto a screen; or in any other desired and suitable form for any purpose.

The main object of the invention is to produce a form of mosaic image that will pass a very much greater percentage of light than the present known forms of mosaic images do.

Hitherto mosaic-color paper-prints have been so dull as to be practically valueless, because half the light which should be otherwise reflected back by the white paper support has been blocked out by an opaque mask or image of metallic silver. But in prints prepared by this invention there is no silver image or mask, and therefore 100% of the light is reflected back less the amount absorbed by the opaque support and by the colored colloid which alone forms the image, and for that reason color prints made by this process are clear, transparent, and as brilliant as the regular type of monochrome print.

Mosaic transparencies prepared by this invention, upon thicker transparent supports, are as transparent and brilliant as the reflective paper prints aforesaid, because the colored images contain no silver or mask.

One distinguishing feature of this new type of mosaic picture is that it is built up from two mosaic part-pictures which are formed back to back and in exact registry with each other upon opposite sides of a transparent support which may if desired be an extremely thin cellulosic film or tissue and each mosaic part-picture is formed of a multitude of minute colored areas or dots or insolublized colored colloid which stand up in relief from a lower layer of silverless imageless transparent gelatine.

There are two such layers of transparent gelatine, each firmly united by an adhesive substratum to opposite sides of the transparent support, and two groups of color-dots each firmly united to its own transparent gelatine layer, one color-group upon one side of the support and the other color-group upon the other side of the support.

The broader base of each color-dot is the side firmly united to its gelatine layer, and therefore the base of each dot is towards the support and the narrower point or apex of each dot is turned away from the support.

The resulting mosaic picture therefore consists of a number of pyramidical points, divided into two colors, a different color upon each opposite side of the same support, which may be described as a pair of multi-color relief images of multi-dot formation.

The colored dots are so placed upon opposite sides of the support that they are positionally interspersed one with the other, so that by transmitted light they appear in close juxtaposition, with no uncovered interspaces through which white light could filter to degrade the brilliancy of the picture.

Another distinguishing feature of this new type of mosaic image is the manner and process by which it is formed, by means of a primary image of metallic silver which is only of temporary character, and a secondary image of insolublized colored colloid dots which is of permanent character.

The pair of primary images of metallic silver are formed in a pair of layers of sensitive gelatino-silver emulsion (one upon each side of the support) by exposure to light through a mosaic negative followed by development. The secondary images are formed without light, by chemical reaction alone, in non-sensitive layers of soluble colored colloid superimposed upon the developed silver images, by first applying a bleach-hardening bath which re-acts upon the metallic silver and colored colloid in conjunction and causes the latter to become insolublized whenever it is in contact with the silver of the primary image, such local insolublization being in direct proportion exactly to the amount of silver in the image. By this means images of insolublized colored colloid are formed upon each side of the support, with the outwardly-directed base of the silver image in intimate contact with the inwardly-directed base of the colored image.

The surplus colored colloid is then dissolved and removed by a suitable solvent which produces images in relief, and the silver is dissolved and removed by another suitable solvent, leaving the colored images quite transparent. The film is then washed and dried.

In this way is formed a thin tissue or leaf, having a pair of partial images in a pair of complementary colors upon opposite sides which combine to produce a complete mosaic picture of two colors.

In an extension of the system 4-color mosaic positives are formed by duplicating the negative images and the film-layers and colors of the positive, in manner hereinafter described.

The term "mosaic" hereinafter used means any kind of broken-tone images suitable for multi-color pictures which comprise dots or lines of geometrical pattern, or accidental design made by any known negative system or process, some examples of which are hereinafter described.

The complete process of producing the color positives is hereinafter more fully described in detail with reference to the accompanying drawing and a description of the mosaic negatives is given at the end of the specification.

In the accompanying drawing:—

Fig. 1 is a section through the sensitive material for making a two-color mosaic positive from a two-color mosaic negative.

Fig. 2 is a section through the sensitive material after development therein of a pair of black metallic silver images and after the application to such images of a porous paper support or backing onto which is coated liquid colloid in which the desired coloring matter is incorporated.

Fig. 3 is a section through the finished color positive.

*The mosaic-color positive*

In the following description of the process it is assumed a 2-color mosaic positive is to be made by this invention from a 2-color mosaic negative.

According to the invention the sensitive material for making a 2-color mosaic positive comprises a transparent support A of cellulose-acetate, celluloid, or other waterproof material, which is coated upon both sides with an adhesive substratum of known type and is then coated upon both sides over the substratum with sensitive gelatino-silver emulsion B1 and B2, preferably of fine-grain and panchromatic type. To prevent light projected upon one emulsion during printing from passing through to the other emulsion a light-obstructing medium is coated between the two layers of emulsion, as in my Patent No. 1,250,713, or alternatively the two emulsion layers may be stained with a soluble dye that will answer the same purpose. Either kind of light-obstructing medium is washed out during subsequent operations.

For mounting as a reflective-print the support A may be extremely thin, such as a tissue about $$\frac{1}{1000}$$

of an inch thick.

For a transparency or cinematograph film a support of much thicker material is used, which may be $$\frac{5}{1000}$$

of an inch, or any other thickness according to requirements.

The first step is to form upon this double-sensitized film a positive of metallic silver which represents one color-part of the mosaic negative, say the red part, and also form upon the opposite side of the film another positive of metallic silver which represents the other color-part of the mosaic negative, say the green.

This double-sided positive print from one 2-color negative is produced by placing the mosaic negative in an optical printing apparatus and projecting two images of the negative onto opposite sides of the positive film, both images being back-to-back in exact registry one with the other and in sharp focus. These two images both alike may be projected and formed by any known optical arrangement.

One of the images is projected through a green color-filter C1 which allows only the green light to pass, and therefore only the green-colored part of the mosaic negative is impressed upon that side of the sensitive film.

The other image is projected through a red color-filter C2 which allows only red light to pass, and therefore only the red-colored part of the mosaic negative is impressed upon the opposite side of the sensitive film, back to back against the green image.

The exposed and printed film is then developed, thus producing a pair of partial-mosaic images D1 and D2 of metallic silver upon opposite sides of the film, both of which represent the same tone gradations as those of the original negative.

The film may then be fixed washed and dried, prior to the next operation of coloring. Or if desired such coloring operation may proceed upon the still wet images after development and washing and before fixing.

The next operation is that of bleaching and coloring the mosaic images of metallic silver.

This operation consists in applying and firmly adhering and uniting to the surface of each of the gelatino-silver image-layer B1, B2 a layer of colored colloid, which may be applied by any known means and method.

The preferred method as shown in Fig. 2 consists in applying what I term an "ozoplaster" E1, E2 to each layer B1, B2, such ozoplaster consisting of a porous paper support or backing onto which is coated liquid colloid in which the desired coloring matter is incorporated, and which may be transparent pigment, mordanted dye, insoluble dye-lake, or other suitable coloring agent.

Instead of using an ozoplaster the colored colloid may be applied to the image of metallic silver in liquid form, by any of the known methods of coating, brushing, floating, or the like, and is then set or dried.

Various forms of colloid may be used, either alone or mixed, such as gelatine, glue, fish-glue, albumen, gum-arabic, gum tragacanth, agar, or casein. The solvent used for developing the colloid image into relief is therefore chosen according to the colloid selected. For gelatine and glue it will be warm water, and for other colloids cold water or other suitable solvent.

After application of the colored colloid the silver images D1 and D2 are next treated in a bleach-hardening solution of well-known type, which usually contains soluble bichromate, ferricyanide, and bromide salts, or in other cases copper salts, or in others chromic acid. Any suitable known formula may be used. The effect of treatment in such a bath is that the silver is bleached and the colored colloid in contact with the silver is rendered insoluble in exact proportion to the amount of silver in the image, and the colored colloid becomes firmly united to the gelatine of the silver image by a process of physical interlocking of the two layers.

The bleached and colored image is then treated in a solvent bath that will dissolve and remove all colloid which still remains soluble and does not form part of the insoluble image. Such bath may be warm or cold water, according to which form of colloid has been used. This converts the colored colloid images into relief images.

The image is also treated in a solvent that will dissolve and remove all salts of silver, such as the common "hypo bath" or "ferricyanide and hypo". This renders the image clear and transparent.

The order of application of the silver solvent and the colloid solvent may be exchanged.

Finally the image is washed and dried.

If the colored colloid is of a kind soluble in warm water, such as gelatine or glue, it is necessary that the gelatine layers B1 and B2 containing the silver images should be insoluble in such solvent. It is therefore hardened at some suitable stage of manufacture, with chrome alum, formaldehyde, or other hardening agent, and this may be effected during manufacture of the sensitive film or during processing treatment before applying warm water solvent. Or a hardener may be incorporated in the fixing bath, warm water treatment being used later.

If the colored colloid is of a kind soluble in cold water, such as gum-arabic for example, no hardening of the gelatino-silver layer is necessary.

In the foregoing description red and green have been used as a simple illustration. But in most 2-color pictures it is preferred to use orange-red and blue-green as the complementary pair of colors to produce the most pleasing result. But the invention is not restricted to any particular combination of coloring. In some cases blue-violet and orange might be used.

An extremely important feature of the invention is that the complementary or inverted colors of the negative are corrected in the positive by applying to each positive image an ozoplaster which is of complementary color to the coloring of the negative from which the positive has been printed, and by this means what would otherwise prove wrong coloring in the positive (as compared with the original scene, owing to having to print through a color-filter of the same color as the inverted color of the negative) is thus corrected and made to rightly correspond to the color of the original scene.

In the final positive picture each image F1 and F2 is formed of a group of color dots f1 or f2 one color group f1 upon one side of the support A and the other color group f2 upon the other side thereof. Each color dot f1 or f2 is of pyramidical shape with its base united to the gelatine layer d1 or d2, and therefore the base of each color dot is towards the central support A and the narrower part or apex is away from the support.

The picture resulting from the process described will comprise, in its first stage, two mosaic images D1 and D2 of metallic silver embedded in two lower layers d1 and d2 of gelatine, and in its final stage as shown in Fig. 3 will comprise two mosaic images F1 and F2 of insoluble colored colloid in upper layers superimposed upon the lower layers d1 and d2 of gelatine from which the mosaic images of silver have been removed. The resulting positive is therefore of subtractive type and entirely different from the usual filter covered mosaic positive which is of additive type. By this means are formed a mosaic picture with a very high degree of transparency and luminosity, which is free from the light-obstructing agents of the old type of mosaic positive, such as the mosaic color-filter screen and the filter-blocking mask of black silver.

In the present invention the complete positive consists of two partial or component positives of transparent colored colloid alone, in mosaic formation, each supported upon a layer of transparent gelatine from which all silver has been removed. Such mosaic positive can be utilized in a number of different ways and for different purposes.

On cinematographic positives it is necessary to add a sound record. This is printed in the margin as a metallic silver positive, and in the coloring process is treated so that it may remain black silver or be made practically colorless or be changed to a colored record by the methods described in my concurrent application Serial No. 718,440 filed March 31, 1934.

Another feature of the invention is that it can be extended to produce 4-color pictures in the same manner by using a pair of mosaic negatives which record four color-separations as described in my Patent No. 1,700,618. The 4-color positive is made by exactly the same procedure as the 2-color hereinbefore described, but the positive film is of doubled area, so that it presents four sensitive pictures-areas to the four projected negative images, and four color-filters are used to separate the four colors, so that only one mosaic component of the four is printed upon each sensitive surface. The two positive films are then developed as before, and four ozoplasters are applied, followed by bleach-hardening, relief development, and silver removal as before. After washing and drying, the two films superimposed and cemented together in accurate image registry one with the other, and thus form a complete mosaic picture of four colors.

The colors for a 4-color picture are preferably formed as two complementary pairs, for example, crimson-violet and green, blue-violet and orange; or red, green, blue, yellow; or any other desired combination.

To simplify the procedure only one positive film and two ozoplasters are used (as in the 2-color example), by making the positive film-material of double area and the ozoplasters of double area with their differently-colored areas adjacent to each other.

*The mosaic negatives or printing clichés*

The negatives (sometimes known as printing clichés) may be of any known form of broken-tone image that records separate analysis of the colors of the original scene or object photographed. The best of these for use with this invention are those known as mosaic negatives.

In its common form this type of negative is generally made with a mosaic filter which gives an analysis of three colors in one picture area, and consists of a transparent support upon which is superimposed a mosaic screen of microscopically small color-filters laid side by side in the same plane and intermingled in close juxtaposition. On this mosaic color-filter is coated a layer of panchromatic sensitive gelatino-silver emulsion of high speed, which is exposed in the camera through the mosaic-filter, then developed, and thus is produced a black mask of silver which defines the image and gradations and blocks out parts of the mosaic filter. The uncovered parts represent the mosaic colored negative, and if the developed image is fixed only, and is not treated by the usual chemical-reversal process (for turning into a positive) its colors are complementary to those of the scene or object photographed.

The preferred form of mosaic-negative for making 2-color mosaic positives by this invention comprises only two colors. And instead of these two being the strong deep colors which are necessary when the negative is required to be changed into a positive, the filters are made of specially light and transparent colorings, so that the camera-exposures can be much shorter or more rapid. And because of the lighter filter-colors, such negatives require shorter exposure in the printing of the positives therefrom. The same rule can be followed in making mosaic negatives, for producing 4-color mosaic positives.

By departing from orthodox filter-coloring in the mosaic negative filters in the manner described, very great technical advantages accrue in the processes of reproduction therefrom.

As the mosaic negatives for use in this invention are only fixed, and are not subsequently treated by the usual chemical reversal process, the colors shown in these direct negatives are complementary to the original colors of the scene or object photographed, and it is therefore necessary to correct them by a color-reversal and not a negative-reversal method. In the present invention this is accomplished by applying to each side of the printed positive of silver images an ozoplaster of a color the same as that of the original scene or object and complementary to the color seen in the negative, as hereinbefore described.

Any other standard form of mosaic negative may be used, such as the ordinary 3-color mosaic which makes three separate color-analysis. Or the mosaic negative may be one which makes four color-analysis in the same picture-area of the same negative.

If the 2-color mosaic positive made according to this invention is reproduced from such a 3-color or 4-color (mosaic or other broken-tone) original negative, then the color scale of the positive represented in only two parts or color-separations will be wider in each part of the positive than in each part of the negative, because each part of the positive will reproduce portions of two parts of each negative, whether such negative be of 3-color or 4-color form. This method of making a 2-color mosaic positive from a negative which represents more than two color-separations therefore has considerable technical advantages.

In a further extension of the invention 4-color mosaic positives are made with four separate color-separations upon four sensitive areas. In one preferred method of doing this a set of 4-color mosaic negatives is used which are made according to Patent No. 1,700,618, in which the four colors are represented in a double-two pair of negatives which combined comprise an analysis of four colors.

In another extension of the same system the 4-color mosaic positives are made with four separate color-separations of a wider range by using a double-three pair of negatives containing an analysis of six colors.

Modified or alternative forms of negatives

Another form of broken-tone negative cliché is that known as a lenticular negative. To make mosaic-color positives from such lenticular negative it is projected onto the double-sensitized positive film through the same or a similar lens and multi-color filter used in taking the negative, after which procedure is as hereinbefore described.

Other types of broken-tone cliché or negative-systems of color-separation which can be used, in conjunction with suitable optical apparatus and color filters, for making mosaic color positives according to this invention, are those known under such various names and types or classes as prismatic, prismatic-dispersion, diffraction, wedge-screen, line-screen, and the like.

Also subtractive negative-systems of color-separation can be used if each negative is covered with an opaque line or dot screen which cuts out part of the picture, and if the two screens of a pair of negatives are made to accurately register.

State of the art

It is already known to form mosaic dot images upon both sides of a positive film by printing completely through the film from a mosaic negative applied to one side of the film by alternately covering the negative with differently colored filters.

In such cases the positive images have been colored by the application of dyes to each side separately, which is an unsatisfactory method, and incapable of giving the perfect images attained by the present invention.

Silver images formed by printing through are not suitable for coloring by applied layers of colored colloid because it could not come in contact with the bases of the silver images and because the colored colloid layer upon the rear side of the support would partially dissolve in the solvent and float off.

Only by projection printing of the primary silver images simultaneously from the same negative upon opposite sides of the support with the bases of such pyramidical dot of the primary silver image outward, is it possible to make colored colloid images with their base inwards and pyramidical points outward, and to form bases of new colloid images by physical contact of silver-image base with colloid-image base and by using a bleach-hardening solution in combination therewith, so that the two kinds of images are formed base to base.

What I claim as my invention and desire to protect by Letters Patent is:—

1. A process for producing a multi-color positive picture of colored colloid relief images of broken tone pyramidical dot formation in two groups of different colors upon opposite sides of a transparent support but in the same picture area which comprises:—projecting from or through a broken-tone multi-colored image of negative character, printing onto opposite sides of the sensitized support (by exposure to light) a pair of partial pictures in accurate back to back interspersed registry one with the other, one of which represents one complementary color-part of the picture (for example, red), and the other represents the other complementary color-part (for example, green) by interposing between negative and positive film a filter upon one side which will pass light of one complementary color only and another filter upon the other side which will pass light of the other complementary color only, each color filter cutting out all other colors; developing the film and forming a pair of broken-tone partial pictures of metallic silver upon opposite sides of the support; applying a differently-colored ozoplaster to each partial picture of metallic-silver; applying a bleach-hardening bath to insolubilize the colored colloid wherever it is in contact with the metallic silver; applying a solvent to dissolve and remove the surplus colloid and form relief images composed of pyramidical dots of insolubilized colored colloid; applying a silver solvent to dissolve and remove the salts of silver and leave the gelatine layer completely transparent; and finally washing and drying the film picture.

2. A photographic or cinematographic broken-tone positive composed of pyramidical points of insolubilized colored colloid of two different colors, disposed upon opposite sides of a transparent support, and connected to the support by an intervening layer of insoluble transparent gelatine from which the silver image has been dissolved and removed; the complete positive comprising the transparent support, a transparent gelatine layer upon and united to each side of each support, and a differently colored partial positive image united to each transparent gelatine layer; each of such partial positive images being composed of pyramidical dots of colored colloid, with their broader bases inward and their narrower points outwards, and the dots of one color positionally interspersed with the dots of the other color upon opposite sides of the supports so that by transmitted light they appear in close juxtaposition with no uncovered interspaces through which white light could filter to degrade the brilliancy of the picture.

3. A 2-color photographic or cinematographic broken tone positive formed of two differently-colored partial pictures disposed upon opposite sides of any transparent support, said images being composed of pyramidical dots of insoluble colored colloid, the images being connected to the support by an intervening layer of insoluble transparent gelatine from which the silver image has been dissolved and removed; the complete positive comprising the transparent support, a transparent gelatine layer upon and united to each side of the support, and a differently-colored partial positive image united to each transparent gelatine layer; each of such partial positive images being composed of pyramidical dots of colored colloid, with their broader bases inward and their narrower points outwards, and the dots of one color positionally interspersed with the dots of the other color upon opposite sides of the supports so that by transmitted light they appear in close juxtaposition with no uncovered interspaces through which white light could filter to degrade the brilliancy of the picture.

4. A 4-color photographic or cinematographic broken-tone positive formed of four differently-colored partial pictures composed of pyramidical dots of insoluble colored gelatine disposed on opposite sides of two transparent supports each image being connected to its support by an intervening layer of insoluble transparent gelatine from which a silver image has been dissolved and removed; and the two supports with their four images being cemented together; the complete 4-color positive comprising the two transparent supports, a transparent gelatine layer upon and united to each side of each support, and a differently-colored partial positive image united to each transparent gelatine layer; each of such partial positive images being composed of pyramidical dots of colored colloid, with their broader bases inward and their narrower points outwards, and the dots of one color positionally interspersed with the dots of the other color upon opposite sides of the supports so that by transmitted light they appear in close juxtaposition with no uncovered interspaces through which white light could filter to degrade the brilliancy of the picture.

JOHN EDWARD THORNTON.